United States Patent
Eberhardt

[15] 3,706,437
[45] Dec. 19, 1972

[54] CLAMP FOR OPTICAL INSTRUMENTS AND THE LIKE

[72] Inventor: Toni Eberhardt, Bad Kreuznach, Rhineland, Germany

[73] Assignee: Jos. Schneider & Co. Optische Werke, Kreuznach, Rhineland, Germany

[22] Filed: Nov. 30, 1970

[21] Appl. No.: 93,648

[30] Foreign Application Priority Data

Dec. 2, 1969    Germany............P 19 60 305.5

[52] U.S. Cl.................................................248/230
[51] Int. Cl..................................................F16b 2/10
[58] Field of Search.......248/230, 231, 226 B, 226 C, 248/316 B, 316 C; 24/248 B, 248 L, 125 N, 125 K

[56] References Cited

UNITED STATES PATENTS

| | | | |
|---|---|---|---|
| 562,532 | 6/1896 | Hartzell | 248/230 |
| 1,509,022 | 9/1924 | Noble | 248/230 |
| 1,568,101 | 1/1926 | Taylor | 248/230 |
| 1,925,699 | 9/1933 | Marshall | 24/248 B |
| 2,071,823 | 2/1937 | Duncan | 248/230 |
| 2,483,012 | 9/1949 | Koon | 248/316 B |
| 3,041,574 | 6/1962 | Cornell | 24/125 K |
| 3,325,776 | 6/1967 | Eppler | 24/125 N |
| 3,544,049 | 12/1970 | Brown | 248/226 B |

FOREIGN PATENTS OR APPLICATIONS

| | | | |
|---|---|---|---|
| 23,395 | 11/1929 | Australia | 248/230 |
| 1,395 | 1/1893 | Great Britain | 248/230 |
| 354,594 | 7/1961 | Switzerland | 248/230 |

*Primary Examiner*—Marion Parsons, Jr.
*Attorney*—Karl F. Ross

[57] ABSTRACT

A clamp for fastening an object to a supporting bar has a body forming a first clamp jaw and carries a swingable arm forming a confronting second clamp jaw; the free end of the arm is bifurcated and engageable by a thumb nut on a bolt also articulated to the body. The pivot of the arm is slidable in an inclined track diverging at a small angle, in the direction toward the body, from the line of force exerted by the engaged thumb nut upon the free end of the arm.

7 Claims, 3 Drawing Figures

PATENTED DEC 19 1972

3,706,437

Toni Eberhardt
Inventor.

By Karl F. Ross
Attorney

CLAMP FOR OPTICAL INSTRUMENTS AND THE LIKE

My present invention relates to a clamp for fastening an object, such as an optical instrument, on a bar-shaped support therefor.

The general object of my invention is to provide a clamp for this purpose which fits supporting bars or studs of different thicknesses and profiles and which can be rapidly secured to or detached from such a bar.

A more particular object is to provide a clamp of this description constructed as a single unit, without any detachable parts that may be lost or mislaid.

These objects are realized, pursuant to my present invention, by the provision of a clamp body provided with conventional coupling means for securing same to its load; a face of this body designed as a clamp jaw, advantageously provided with a groove of polygonal (preferably trapezoidal) cross-section, co-operates with a complementary clamp jaw in the form of a swingable arm which advantageously has a similar, confronting groove and which is articulated to the body with freedom of relative sliding in a direction generally perpendicular to the aforementioned face. A latch also articulated to the body, preferably at a location near that face lying on the side opposite the pivot of the swingable arm with reference to the support-engaging groove, is designed to grip the free end of the arm in an operative position thereof and to exert pressure on that end in a direction substantially perpendicular to the clamping face of the body.

The slidability of the locking arm with reference to the body is obtained by guiding the pivoted end of that arm in a track which is generally perpendicular to the clamping face but is preferably inclined at a small angle, relative to the line of force exerted by the latch in the operative position of the arm, in order to provide a transverse stress component reinforcing the grip of the clamp on the engaged support.

The above and other features of my invention will be described in detail hereinafter with reference to the accompanying drawing in which.

Figure 1:
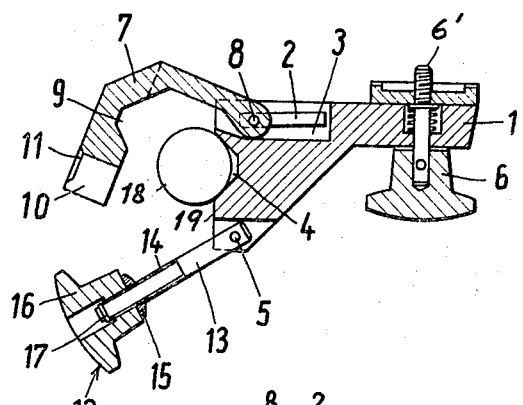
FIG. 1 is a cross-sectional view of my improved clamp, shown in an open position.

The clamp shown in the drawing has a body 1 to which a generally elbow-shaped arm 7 is articulated for swinging in a radial plane of a supporting bar 18 to be gripped by the clamp. The hinged end of arm 7 carries a pivot pin 8 which is guided in a track formed by a pair of slots 2 in the walls of an upwardly open recess 3 extending inwardly from a face 19 of body 1. Face 19 has a groove 4 of trapezoidal profile co-operating with a confronting similar groove 9 of arm 7 to grip the bar 18 therebetween. A knob 6 with threaded stem 6' serves to secure the body 1 to a load not illustrated, e.g., a television camera, which is to be mounted on bar 18.

A latch, generally designated 12, comprises a bolt 13 which is pivoted at 5 to body 1, the two pivots 5 and 8 being located on opposite sides of groove 4 so that latch 12 may be swung underneath the supporting bar 18 into engagement with the free end of arm 7. This free end is bifurcate to form a pair of prongs 10 whose spacing slightly exceeds the diameter of the bolt 13 receivable therebetween; a circular depression 11 at the outer surface of arm 7, of a diameter greater than the spacing of prongs 10, accommodates a neck 15 on a thumb nut 16 threaded onto the free end of latch bolt 13; this keeps the bolt 13 from being forced out of the bifurcation 10 by downward pressure once the nut has been tightened. A retaining ring 17 prevents a detachment of nut 16 from bolt 13.

Figure 2:
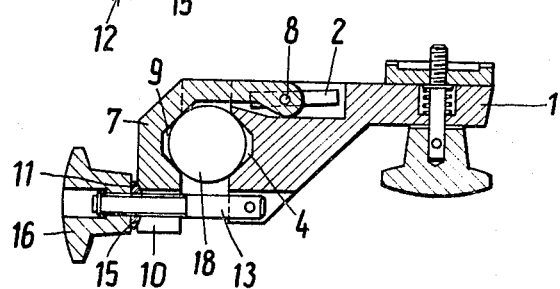
FIG. 2 is a view similar to FIG. 1, showing the clamp locked around a supporting bar.
Figure 3:
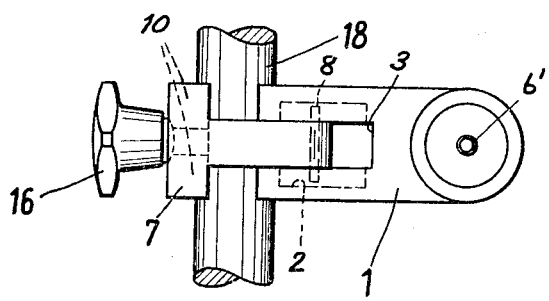
FIG. 3 is a top plan view of the assembly of FIG. 2.

In gripping the bar 18, as illustrated in FIGS. 2 and 3, the straight portion of arm 7 proximal to its bifurcate end 10 lies parallel to the face 19 of clamp body 1 so that the pressure exerted by the thumb nut 16 and the bolt 13 upon the arm 7 is perpendicular to that face. The track 2 for the pivot 8 of arm 7 is inclined at a small angle with reference to the pressure vector, diverging from that vector and from the plane of symmetry of groove 4 (perpendicular to face 4) as viewed in the direction of the exerted force (i.e. from left to right in FIG. 2). This results in a reaction force at pivot 8 with a component tending to draw that pivot upwardly as viewed in FIGS. 1 and 2, owing to the camming effect of the inclined track slots 2. Within the limits of adjustability set by the length of track 2 and bolt 13, the same camming effect will come into play with narrower and wider supporting bars 18, resulting in a relative shifting of the polygonal profiles of grooves 4 and 9 to enhance the clamping pressure. This will also be true if the bar profile should be such that the part of arm 7 forming the groove 9 is no longer exactly parallel to face 19 in its clamping position but diverges downwardly from it.

Bar 18 may be rigid with a housing, not shown, for a motor serving to drive the load engaged by the coupling knob 6; more generally, it may be a rail or other extension of any fixed or mobile structure on which the load is to be temporarily supported.

I claim:

1. A clamp for fastening a load to a bar-shaped support, comprising:

a body provided with a face having a first groove engageable with a lateral surface of the support;

coupling means on said body for joining same to the load;

an arm pivotally secured at one end thereof to said body on one side of said first groove and provided with a portion spacedly overhanging said face, said arm being formed at said portion with a second groove confronting said first groove, said body forming a track for the pivot of said one end diverging at a small angle from a plane of symmetry of said first groove, perpendicular to said face, in a direction away from said face whereby said pivot is shifted away from said plane of symmetry upon a displacement of said portion toward said face; and latch means articulated to said body at the opposite side of said first groove for engagement with said arm, the latter having a free other end beyond said portion engageable by said latch means for maintaining said portion substantially parallel to said face in an operative position to hold said support gripped between said grooves.

2. A clamp as defined in claim 1 wherein said grooves are of polygonal cross-sections.

3. A clamp as defined in claim 2 wherein said cross-sections are substantially trapezoidal.

4. A clamp as defined in claim 1 wherein said other end of said arm forms a pair of parallel prongs, said latch means including a bolt receivable between said prongs and a nut on said bolt tightenable against said prongs.

5. A clamp as defined in claim 4 wherein said other end is provided with an outer circular depression of a diameter greater than the spacing of said prongs, said nut having a neck fitting into said depression for preventing disengagement of said bolt from said prongs.

6. A clamp as defined in claim 1 wherein said body has a recess extending inwardly from said face, said recess being bounded by sides lying parallel to the pivotal plane of said arm and receiving said one end thereof between them, said track being formed by a pair of slots in said sides slidably accommodating a pair of projections on said one end.

7. A clamp as defined in claim 1 wherein said arm is generally elbow-shaped.

* * * * *